Z. ELLIS.

Anchors for Securing Cores.

No. 5,540. Reissued August 19, 1873.

Witnesses:

Millard F. Walton,

Robert H. Hoz.

Inventor:

Zabina Ellis by

John A. Wiedersheim & Co.

Attys.

AM. PHOTO-LITHOGRAPHIC CO. N.Y. (OSBORNE'S PROCESS)

UNITED STATES PATENT OFFICE.

ZABINA ELLIS, OF PHILADELPHIA, PENNSYLVANIA.

IMPROVEMENT IN ANCHORS FOR SECURING CORES.

Specification forming part of Letters Patent No. 98,676, dated January 11, 1870; reissue No. 5,540, dated August 19, 1873; application filed June 23, 1873.

*To all whom it may concern:*

Be it known that I, ZABINA ELLIS, of the city and county of Philadelphia and State of Pennsylvania, have invented a new and useful Improvement in the Mode of Securing Cores in Molds; and I do hereby declare the following to be a full, clear, and exact description of the nature thereof, sufficient to enable others skilled in the art to which my invention appertains to fully understand, make, and use the same, reference being had to the accompanying drawings making part of this specification, in which—

Figure 1:
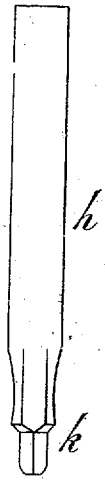
Figure 2:
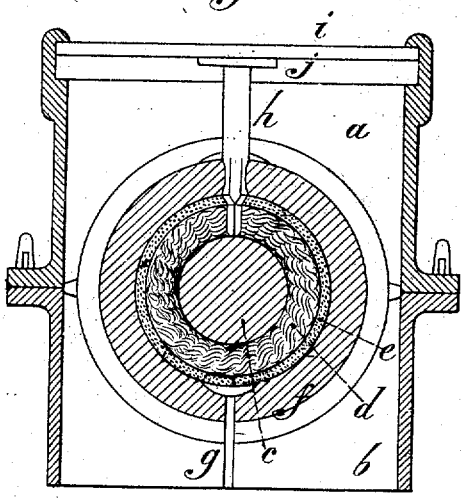
Figure 3:
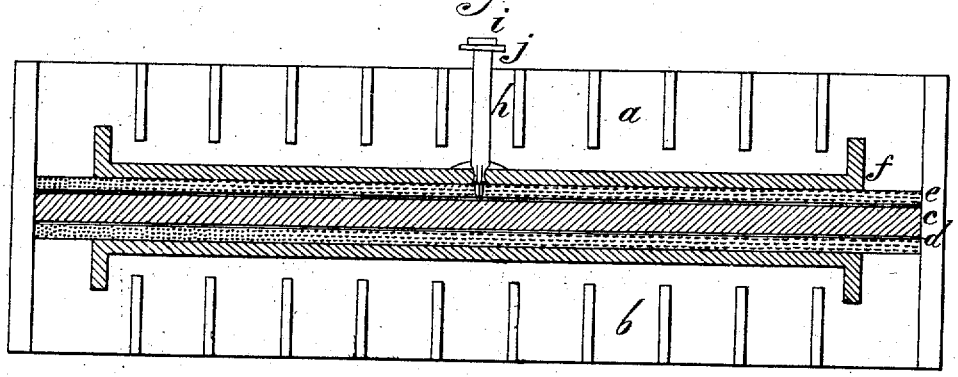

Figure 1 is a side elevation of an anchor or implement adapted for securing cores. Fig. 2 is a transverse section, and Fig. 3 a longitudinal section, respectively, of a two-part flask as prepared for the casting of a pipe, the same illustrating my invention.

Similar letters of reference indicate corresponding parts in the several figures.

In casting iron pipes it is essential to adopt some plan for securing the core in the mold to prevent the rising thereof when the molten metal is introduced. The core is supported from below by the sand in the flask, or by metallic sockets in the sides of the flask, or by anchors—two or more—such as are shown at *g*, Fig. 2; and to secure the core from above, an anchor, similar to the anchor *g*, has been, or several such anchors have been, hitherto employed. In such case the curved head of each anchor abuts against the loam of the core, and the leg of the anchor, being projected through a hole in the cope or top half of the flask, is held down by a clamp, one form of which is shown in Fig. 2. This mode of anchoring cores I have found to be defective in this, that the pipes so cast are of uneven and uncertain thickness, being thicker in those parts formed in the lower part of the mold, and thinner in opposite parts. This defect is due to the imperfect mode of anchoring from the cope. The cope-anchor, not being in contact with the solid spindle of the core, permits the core to rise from the yielding of its hay rope and loam as the molten metal is poured into the mold. I obviate these defects, and secure the casting of pipes with even thickness by employing an anchor which is driven through the loam and hay rope of the core directly against the spindle of the core.

Referring to the drawings, *a* represents the cope, and *b* the drag or upper and lower halves, respectively, of the flask; *c*, the spindle of the core; *d*, the hay rope wound about the spindle; *e*, the loam, which coats the hay rope; *f*, the space for the metal; *g*, the anchor, having a curved head for supporting the core from the drag in its place in the mold; *h*, an anchor, such as I employ for securing the core from the upper side; *i*, a clamp, and *j* a wedge for holding the anchor *h* in place.

The anchor is driven through the various layers and covers, directly against the spindle of the core, whereby the core is firmly held in place.

The driving end of the anchor *h* may have increased thickness, forming a shoulder at *k*, Fig. 1. I prefer to give it this form, with the view of increasing its power of resistance against the action of the hot metal. This form I employ in casting pipes of twelve inches diameter and other heavy pipes; but for light pipes, or pipes of less diameter, the anchor *h* may be of a continuous taper from the driving end, or it may, in either case, be in the form of a bar of small diameter, cylindrical from end to end; but in this form it cannot be so readily driven through the loam and hay rope.

Having thus described my invention, what I claim as new, and desire to secure by Letters Patent, is—

The anchor *h*, constructed substantially as described, and capable of being driven through the various layers against the barrel of the core, so as to hold down the core, in the manner set forth.

ZABINA ELLIS.

Witnesses:
JOHN A. WIEDERSHEIM,
MILLARD F. WALTON.